United States Patent [19]

Sakogawa et al.

[11] Patent Number: 6,011,090
[45] Date of Patent: Jan. 4, 2000

[54] RESIN COMPOSITION, CONDUCTIVE ROLLER PREPARED BY MOLDING THE COMPOSITION AND ELECTRONIC PHOTOGRAPHIC CARTRIDGE

[75] Inventors: Kouichi Sakogawa; Manabu Nishikawa; Tsutomu Isaka; Koukichi Komatsuzaki, all of Ami; Hideki Takahashi, Mie, all of Japan

[73] Assignee: Mitsubishi Chemical Corporation, Tokyo, Japan

[21] Appl. No.: 08/988,373

[22] Filed: Dec. 10, 1997

[30] Foreign Application Priority Data

Dec. 13, 1996 [JP] Japan ................................. 8-333454

[51] Int. Cl.$^7$ ............................ C08K 3/04; C08L 57/10
[52] U.S. Cl. ..................... 523/438; 399/176; 523/468; 524/525; 524/528
[58] Field of Search .................... 523/438, 468; 524/525, 528; 399/176

[56] References Cited

U.S. PATENT DOCUMENTS

| 5,742,880 | 4/1996 | Takenaka et al. ............. 399/176 |
| 5,751,801 | 5/1998 | Murata et al. ............... 399/176 |

FOREIGN PATENT DOCUMENTS

| 0 574 169 | 12/1993 | European Pat. Off. . |
| 51-14894 | 5/1976 | Japan . |
| 1-117149 | 5/1989 | Japan . |
| 5-313471 | 11/1993 | Japan . |
| 6-256552 | 9/1994 | Japan . |

OTHER PUBLICATIONS

Derwent Abstract, AN 93–224045, JP 5–147 763, Jun. 15, 1993.

Derwent Abstract, AN 97–492900, JP 9–071 699, Mar. 18, 1997.

Chemical Abstract, AN 108:169013, JP 62–285 925, Dec. 11, 1987.

Chemical Abstract, AN 123:35101, JP 7–102 131, Apr. 18, 1995.

Chemical Abstract, AN 120:193855, JP 5–279 521, Oct. 26, 1993.

*Primary Examiner*—Robert Dawson
*Assistant Examiner*—D. Aylward
*Attorney, Agent, or Firm*—Oblon, Spivak, McClelland, Maier & Neustadt, P.C.

[57] ABSTRACT

A resin composition comprising a resin (a) and a conductive filler (b), wherein the resin (a) contains a styrene type thermoplastic elastomer and/or an olefin type thermoplastic elastomer, said resin composition having a volume resistivity of from $10^2$ to $10^{12}$ Ω·cm and a compression set (Cs1) of at most 35% by JIS K6301.

18 Claims, No Drawings

RESIN COMPOSITION, CONDUCTIVE ROLLER PREPARED BY MOLDING THE COMPOSITION AND ELECTRONIC PHOTOGRAPHIC CARTRIDGE

The present invention relates to a resin composition and a conductive roller prepared by molding it. More particularly, it relates to a conductive resin composition comprising a thermoplastic elastomer and a conductive filler and having a volume resistivity within a specific range and a compression set within a specific range, and a conductive roller prepared by molding it, which is useful for e.g. office appliances or equipments, automobiles, electric appliances, medical instruments, equipments for food products, electric wires and sundries.

As a conductive roller used in the field of office appliances or equipments, automobiles, electric appliances, medical instruments, equipments for food products, electric wires or sundries, one having a soft conductive material laminated on a metal core is commonly employed.

As such a soft conductive material, a rubber composition having an electric conductivity-imparting agent such as carbon black incorporated to vulcanized rubber, is widely used. However, vulcanized rubber requires a cumbersome step such as a vulcanization step in its production, and a material which does not require such a step, is desired. As a material having mechanical properties equal to vulcanized rubber in the form of a molded product, a thermoplastic elastomer may be considered. However, a usual thermoplastic elastomer has a problem in moldability, and further, as compared with a vulcanized rubber composition, it has had a problem with respect to physical properties such as compression set. Accordingly, it has not been practically employed.

It is an object of the present invention to provide a resin composition suitable for a conductive roller, which is excellent in adhesion to the core, durability and electroconductivity and which is excellent also in physical properties such as hardness and compression set.

Another object of the present invention is to provide a resin composition suitable for a conductive roller, which provides high bond strength between the resin composition layer and the metal core or between the resin composition layer and the protective layer.

The present inventors have conducted an extensive study to solve the above problems and as a result, have found that a certain specific resin composition provides excellent moldability and electroconductivity, and it is possible to obtain a conductive resin composition having improved compression set. The present invention has been accomplished on the basis of this discovery.

Thus, in a first aspect, the present invention provides a resin composition comprising a resin (a) and a conductive filler (b), wherein the resin (a) contains a styrene type thermoplastic elastomer and/or an olefin type thermoplastic elastomer, said resin composition having a volume resistivity of from $10^2$ to $10^{12}$ Ω·cm and a compression set (Cs1) of at most 35% by JIS K6301.

In a second aspect, the present invention provides a resin composition comprising a resin (a) and a conductive filler (b), wherein the resin (a) contains a styrene type thermoplastic elastomer and/or an olefin type thermoplastic elastomer, said resin composition having an epoxy equivalent of from 3,000 to 1,000,000 g/equivalent.

In a third aspect, the present invention provides a resin composition comprising a resin (a), a conductive filler (b) and a resin modifier (c), wherein the resin (a) contains a styrene type thermoplastic elastomer and/or an olefin type thermoplastic elastomer, and the resin modifier (c) is an epoxy compound having an epoxy equivalent of from 1,000 to 100,000 g/equivalent.

In a fourth aspect, the present invention provides a resin composition comprising a resin (a), a conductive filler (b) and a resin modifier (c), said resin composition having a volume resistivity of from $10^2$ to $10^{12}$ Ω·cm and satisfying the following formula (I):

$$Cs1 \leq 0.9 \times Cs2 \tag{I}$$

where Cs1 is the compression set of said resin composition by JIS K6301, and Cs2 is the compression set of a composition having the resin modifier removed from said resin composition.

In a fifth aspect, the present invention provides a conductive roller prepared by molding any one of the above resin compositions.

In a sixth aspect, the present invention provides an electronic photographic cartridge having the above conductive roller built in as a charged roller.

Now, the present invention will be described in detail with reference to the preferred embodiments.

The resin (a) (hereinafter sometimes referred to as "the base resin") to be used in the present invention, is preferably a thermoplastic elastomer. As a particularly preferred thermoplastic elastomer, a styrene type thermoplastic elastomer and/or an olefin type thermoplastic elastomer may be mentioned. The physical properties of these thermoplastic elastomers are not particularly limited, but the flexural modulus by JIS K7203 is usually less than 5,000 kg/cm$^2$, preferably less than 4,000 kg/cm$^2$, more preferable less than 3,000 kg/cm$^2$.

A preferred olefin type thermoplastic elastomer to be used in the present invention, may, for example, be an olefin type copolymer rubber, such as an elastic body of an amorphous random copolymer comprising an olefin as the main component, such as an ethylene-propylene copolymer rubber (EPM) or an ethylene-propylene-non-conjunated diene copolymer rubber (EPDM) or one having such an elastic body subjected to heat treatment in the presence of an organic peroxide and thus comprising mainly an elastic body cross-linked by radicals, as the base component.

Specific examples of the olefin type copolymer rubber include the above mentioned ethylene-propylene copolymer rubber (EPM), an ethylene-1-butene copolymer rubber (EPM), an ethylene-propylene-butene copolymer rubber, an ethylene-hexene copolymer, an ethylene-heptene copolymer, an ethylene-octene copolymer, an ethylene-4-methylpentene-1 copolymer, or an ethylene-propylene-non-condinated diene copolymer rubber employing as a non-conjugated diene an aliphatic diene such as butene-1 or 1,4-hexadiene, 5-ethylidinenorbornene, 5-methylnorbornene, 5-vinylnorbornene, dicyclopentadiene, or dicyclooctadiene.

Such a copolymer or a copolymer rubber may be a random copolymer, a block copolymer, a graft copolymer, or an alternating copolymer, and the method for its production or the shape is not particularly limited. Further, these olefin type copolymer rubbers may be used alone or in combination as a mixture of a plurality of them.

As such an olefin type copolymer rubber, it is preferred to employ a copolymer rubber having a weight average molecular weight of from 50,000 to 1,000,000, preferably from 60,000 to 800,000, more preferably from 80,000 to 500,000, an ethylene content of from 30 to 90 wt %, preferably from 40 to 80 wt %, and a Mooney viscosity ML$_{1+4}$(100° C.) of from 5 to 400, preferably from 10 to 350.

If the weight average molecular weight of the above mentioned ethylene-propylene type copolymer rubber is less than the above range, the rubber elasticity and the mechanical strength tend to be poor, and if the weight average molecular weight exceeds the above range, the moldability tends to be poor.

Here, the "weight average molecular weight" is a weight average molecular weight as calculated as polystyrene, measured under the following conditions by gel permeation chromatography (GPC).
Conditions
    Equipment: 150° C. ALC/GPC (Manufactured by MILLIPORE Company)
    Column: Polystyrene mixgel column
    Solvent: o-Dichlorobenzene
    Temperature: 140° C.
    Concentration: 2 mg/ml (Antioxidant 2, 6-di-t-buthyl-4-methyl-phenol was added in an amount of 0.2 wt %. The concentration was measured by an infrared spectrophotometer with a wavelength of 3.42 μm.)

An olefin type thermoplastic elastomer comprising such an olefin type copolymer rubber as the base material, is commercially available, for example, as "Thermolan" manufactured by Mitsubishi Chemical Corporation, "Milastmor" manufactured by Mitsui Chemical Industries, Ltd., "SumitomoTPE" manufactured by Sumitomo Chemical Co., Ltd., or "Santplane" manufactured by Advanced Elastomer Systems Company.

A preferred styrene type thermoplastic elastomer to be used in the present invention may, for example, be one comprising as a base component a hydrogenated product of a styrene-conjugated diene block copolymer selected from a hydrogenated product of a styrene-butadiene block copolymer, a hydrogenated product of a styrene-isoprene block copolymer, and a mixture thereof. The hydrogenated product of a styrene-conjugated diene block copolymer comprises a polymer block wherein the conjugated diene is butadiene alone, isoprene alone or a mixture of isoprene and butadiene, and specifically, it may be a hydrogenated product of a styrene-butadiene-styrene block copolymer (hereinafter sometimes referred to simply as "hydrogenated S-B-S"), a hydrogenated product of a styrene-isoprene-styrene block copolymer (hereinafter sometimes referred to simply as "hydrogenated S-I-S") or a hydrogenated product of a styrene-isoprene-butadiene-styrene block copolymer (hereinafter sometimes referred to simply as "hydrogenated S-BI-S").

Such a hydrogenated product of a styrene-conjugated diene copolymer is preferably a block copolymer having a weight average molecular weight of from 50,000 to 500,000, preferably from 120,000 to 450,000, more preferably from 150,000 to 400,000, a styrene content of from 5 to 50 wt %, preferably from 8 to 45 wt %, more preferably from 10 to 40 wt %, a 1,2-micro structure of less than 50%, preferably less than 45% and a hydrogenation ratio of at least 95%, preferably at least 97%.

Here, the "weight average molecular rate" is a weight average molecular weight as calculated as polystyrene measured under the following condition by gel permeation chromatography (GPC).
Conditions
    Equipment: 150° C. ALC/GPC (Manufactured by MILLIPORE Company)
    Column: Polystyrene mixgel column
    Solvent: o-Dichlorobenzene
    Temperature: 140° C.
    Concentration: 2 mg/ml (Antioxidant 2, 6-di-t-buthyl-4-methyl-phenol was added in an amount of 0.2 wt %. The concentration was measured by an infrared spectrophotometer with a wavelength of 3.42 μm.)

If the weight average molecular weight of the above hydrogenated product of a styrene-conjugated diene block copolymer is less than 50,000, the rubber elasticity and the mechanical strength tend to be poor, and if it exceeds 500,000, the moldability tends to be poor.

As a method for producing such a hydrogenated product of a styrene-conjugated diene copolymer, there may be mentioned, for example, a method wherein a styrene-conjugated diene copolymer is prepared in an inert solvent by means of a lithium catalyst by a method disclosed e.g. in JP-B-40-23798, and then hydrogenation is carried out in an inert solvent in the presence of a hydrogenation catalyst by a method disclosed e.g. in JP-B-42-8204, JP-B-43-6636, JP-A-59-133203 or JP-A-60-79005.

Further, hydrogenated S-I-S and hydrogenated S-BI-S may be obtained by a method disclosed in JP-A-2-102212 or JP-A-3-188114 i.e. a method wherein styrene and isoprene or isoprene-butadiene are polymerized in an inert solvent at a temperature of from −20 to 80° C. for from 1 to 50 hours in the presence of from 0.01 to 0.2 parts by weight of an alkyl lithium compound as an initiator and from 0.04 to 0.8 part by weight of a coupling agent, per 100 parts by weight of the total monomers, and from 0.1 to 400 parts by weight of a Lewis base, per 100 parts by weight of the initiator, and then isoprene or isoprene-butadiene blocks are hydrogenated.

As a commercial product, "Cleiton G" manufactured by Shell Japan K. K., "Septon" or "Hyblor" manufactured by Kuraray Co., Ltd., "Toughteck" manufactured by Asahi Chemical Industry Co., Ltd., or "Dinaron" manufactured by Japan Synthelic Rubber Co., Ltd., may, for example, be mentioned.

Further, as a styrene type thermoplastic elastomer comprising, as a base material, such a hydrogenated product of a styrene-conjugated diene block copolymer, "Rubberon" manufactured by Mitsubishi Chemical Corporation, "Cleiton G Compound" manufactured by Shell Japan K. K., "Septon Compound" manufactured by Kraray Co., Ltd., or "Toughtec Compound E series, S series" manufactured by Asahi Chemical Industry Co., Ltd., may, for example, be mentioned.

The conductive filler (b) to be used in the present invention, is employed so that the resin composition of the present invention can provide electroconductivity. The following examples will be given, but it should be understood that the useful conductive filler is not limited to such specific examples.

For example, it may be carbon material such as carbon black, graphite or carbon fibers, a metal powder such as aluminum or magnesium powder, a metal material such as metal fibers, or a surface-treated metal oxide powder. Among them, carbon black is preferred.

With respect to the physical properties of the carbon black, the average particle size of primary particles of the carbon black is preferably from 5 to 300 nm, more preferably from 10 to 100 nm. If the particle size is unduly large, the specific surface area becomes small, and the electroconductivity tends to be poor. On the other hand, if the particle size is unduly small, the dispersibility in the matrix resin tends to be poor. Further, the DBP oil absorption is preferably from 10 to 1000 ml/100 g, more preferably from 50 to 300 ml/100 g. If the DBP oil absorption is unduly small, it tends to be difficult to obtain adequate electroconductivity.

As a carbon black which satisfies these desired conditions, furnace black or acetylene black may be mentioned. Specifically, "Denka black granule" manufactured by Denki Kagaku K. K. or "Mitsubishi Conductive Carbon Black #3600" manufactured by Mitsubishi Chemical Corporation is commercially available.

The blend ratio of such a conductive filler is usually from 2 to 200 parts by weight, preferably from 4 to 50 parts by weight, more preferably from 5 to 20 parts by weight, per 100 parts by weight of the resin.

In such a case, a preferred blend amount varies depending upon the electroconductivity of the conductive filler to be used. However, it is preferably selected so that the volume resistivity of the elastomer composition will be within a range of from $10^2$ to $10^{12}$ Ω·cm, more preferably from $10^4$ to $10^{10}$ Ω·cm, most preferably from $3 \times 10^4$ to $10^8$ Ω·cm.

In the present invention, it is preferred to employ a resin modifier (c) in order to accomplish a proper compression set of the resin composition. The resin modifier (c) to be used in the present invention, is not particularly limited so long as it is a compound having the desired effects. Specifically, however, it may be a compatibilizing agent for the resin, and an epoxy compound may be mentioned as a particularly preferred compound. The epoxy compound will be described as a typical example of the resin modifier.

The epoxy compound to be used in the present invention has a role of improving the compression set of the resin composition.

In general, if another component is incorporated to a thermoplastic elastomer, the compression set tends to deteriorate. In fact, when either the conductive filler or the epoxy compound is incorporated to the thermoplastic elastomer to be used in the present invention, the compression set deteriorates in many cases. Surprisingly, however, it has been found that when both the conductive filler and the epoxy resin are incorporated to the thermoplastic elastomer, the essential compression set characteristic of the thermoplastic elastomer can be maintained, and an improved effect can often be obtained.

The reason why such an effect can be obtained in the present invention, is not clearly understood. However, it is considered that reactive epoxy groups give some influence over the interface condition between the base elastomer and the conductive filler to properly control the dispersion state of the conductive filler.

Further, it has been found that by incorporating the epoxy compound, when the resin composition is applied to a conductive roller, the bond strength between the resin composition layer and the metal core or between the resin composition layer and the protective layer, will increase.

The epoxy compound to be used in the present invention is not particularly limited so long as it is an organic compound having an epoxy group in its molecule. For example, it may be an ester of an alcohol having an epoxy group such as glycidyl alcohol or oxycyclohexenol with a carboxylic acid having an ethylenic double bond such as acrylic acid or methacrylic acid, or a polymer obtained from such an ester as a monomer component. Among them, a copolymer comprising glycidyl ester of (meth)acrylic acid, is preferably employed. Specific examples of such an epoxy compound include an ethylene-glycidylmethacrylate copolymer, an ethylene-glycidylmethacrylate graft-polymethylmethacrylate, and an ethylene-glycidylmethacrylate-graft-polystyrene. Further, the epoxy equivalent of the epoxy compound is preferably from 1,000 to 100,000 g/equivalent.

As a method for incorporating epoxy groups into the resin composition, not only a method of adding the above epoxy compound as a resin modifier to the mixture of the base resin and the conductive filler, but also a method of introducing epoxy groups into the base resin itself by using a compound having an epoxy group as one component of monomers to form the base resin or by modifying the base resin with an epoxy compound, and mixing a conductive filler thereto, may be employed.

If epoxy groups in the elastomer composition are little, no adequate effect of the present invention may sometimes be obtained. Accordingly, in the total composition of the base resin and the epoxy compound, the epoxy equivalent is preferably at most 500,000 g/equivalent, more preferably at most 300,000 g/equivalent. Further, to obtain an adequate effect for improving the compression set, it is most preferably at most 150,000 g/equivalent.

Further, in the entire composition of the resin composition including the conductive filler, the epoxy equivalent is preferably from 3,000 to 1,000,000 g/equivalent.

If the epoxy equivalent of the epoxy compound itself is high, it may happen that no adequate effect for improving the compression set is obtainable unless its blend amount is increased. Accordingly, the epoxy equivalent of the epoxy compound itself is preferably at most 100,000 g/equivalent.

Further, if the amount of the epoxy compound is too much, the physical property other than the compression set may deteriorate, such that the hardness tends to be high. Accordingly, its blend ratio is preferably from 0.1 to 30 parts by weight, more preferably from 0.1 to 20 parts by weight, most preferably from 0.1 to 10 parts by weight, per 100 parts by weight of the resin.

Specifically, such an epoxy compound is commercially available, for example, as "Modiper A 4200" or "Blenmor CP30P" manufactured by Nippon Oil and Fats Co., Ltd. or "Bond fast E" manufactured by Sumitomo Chemical Co., Ltd.

The compression set of the resin composition of the present invention is improved by an addition of a resin modifier (component(c)) such as an epoxy compound. Such an effect for improvement is preferably within such a range that the compression set (Cs1) of the resin composition of the present invention by JIS K6301 and the compression set (Cs2) of a resin composition having component (c) excluded from said resin composition, satisfy the following formula (I):

$$Cs1 \leq 0.9 \times Cs2 \qquad (I)$$

The conductive resin composition of the present invention is useful for a conductive roller such as a charged roller for e.g. a laser beam printer. However, if the compression set (Cs1) of the composition is large, there will be a problem of deformation due to contact for a long period of time with a material to be contacted such as a photosensitive material. Accordingly, the compression set is preferably as small as possible within a range not to impair other physical properties such as hardness.

Such a compression set is preferably at most 35%, more preferably at most 30%, whereby the composition can be practically used without a problem such as deformation.

The smaller the value of the compression set, the better the performance. The lower limit is theoretically 0. Cs1 may take a value of at least 0, but it is usually at least 5%, more commonly at least 10%.

According to the present invention, by adding a resin modifier (c) such as an epoxy compound to the thermoplastic composition comprising a resin (a) such as a styrene type thermoplastic elastomer and/or an olefin type thermoplastic elastomer, and a conductive filler (b), the compression set may be reduced by at least 10%, and by optimizing the blend ratio, by at least 20%, without substantially impairing the physical property such as the hardness, and it is possible to provide a resin composition having a compression set of from 0 to 35%, which can be regarded as a material suitable for a conductive roller.

Further, it is preferred not only that the compression set of the resin composition is small, but also that the hardness is low. If the hardness is high, for example, when it is used as a charged roller, there will be a problem such that no adequate nip width can be obtained with a photosensitive material. Accordingly, the hardness is preferably from 0 to 70, more preferably from 0 to 55, most preferably from 0 to 40, by JIS A.

To the resin composition of the present invention various optional blend components may be incorporated depending upon various purposes.

Specifically, various additives including a hydrocarbon type softening agent for rubber, various plasticizers, an antioxidant, a thermal stabilizer, a photo stabilizer, an ultra violet absorber, a neutralizing agent, a lubricant, an antifogging agent, an anti-blocking agent, a slipping agent, a cross-linking agent, a cross-linking adjuvant, a coloring agent, a flame retardant, a dispersing agent, and an antistatic agent, may be added.

Further, within a range not to substantially impair the effects of the present invention, blend materials such as various thermoplastic resins or various elastomers may be incorporated.

Among the above additional blend materials, a hydrocarbon type softening agent for rubber can play an important role for controlling the flexibility and the processability of the olefin type or styrene type thermoplastic elastomer composition.

Such a hydrocarbon type softening agent for rubber (average molecular weight is usually from 300 to 2,000, preferably from 500 to 1,500) is incorporated preferably in an amount of from 0 to 250 parts by weight, more preferably from 20 to 200 parts by weight, per 100 parts by weight of the hydrogenated product of a styrene-conjugated diene block copolymer.

Such a hydrocarbon type softening agent for rubber is a mixture having an aromatic ring, a naphthene ring and a paraffin combined. One in which the carbon number of the paraffin chain constitutes at least 50% of the total carbon, is called a paraffin type oil. One wherein the carbon number of the naphthene ring constitutes from 30 to 45%, is called a naphthene type oil.

Likewise, one wherein the carbon number of the aromatic ring constitutes more than 30%, is called an aromatic type oil. It is particularly preferred to use the paraffin type oil among them.

Further, among the above mentioned additional blend components, the thermoplastic resin may, for example, be a polyolefin resin such as polypropylene, an ethylene type resin or a polybutene-1 resin, a polystyrene type resin such as polystyrene, an acrylonitrile-styrene copolymer or an acrylonitrile-butadiene-styrene copolymer, a polyphenylene ether type resin, a polyamide type resin such as nylon 6 or nylon 66, a polyester type resin such as polyethylene terephthalate or polybutene terephthalate, a polyoxymethylene type resin such as a polyoxymethylene homopolymer or a polyoxymethylene copolymer, or a polymethyl methacrylate type resin.

The ethylene type resin may, for example, be polyethylene, an ethylene-α-olefin copolymer, an ethylene-vinyl acetate copolymer, an ethylene-(meth)acrylic acid copolymer or an ethylene-(meth)acrylate copolymer.

The above polyethylene may, for example, be low density polyethylene (a branched ethylene polymer), or medium density or high density polyethylene (linear ethylene copolymer).

The above ethylene-α-olefin copolymer may, for example, be an ethylene-butene-1 copolymer, an ethylene-hexene copolymer, an ethylene-heptene copolymer, an ethylene-octene copolymer, or an ethylene-4-methylpentene-1 copolymer.

The thermoplastic resins may be used alone or in combination as a mixture of a plurality of them. Such a thermoplastic resin is usually incorporated in an amount of from 1 to 300 parts by weight, preferably from 20 to 250 parts by weight, per 100 parts by weight of the olefin type copolymer rubber or the hydrogenated product of styrene-conjugated diene block copolymer.

Further, among the above mentioned additional blend components, the elastomer may, for example, be a polyester type elastomer, a polyurethane type elastomer, a polyamide type elastomer, or an olefin type elastomer. Such elastomers may be used alone or in combination as a mixture of a plurality of them. Such an elastomer is preferably incorporated usually in an amount of from 0 to 300 parts by weight, preferably from 0 to 100 parts by weight, per 100 parts by weight of the hydrogenated product of a styrene-conjugated diene block copolymer.

The method for mixing the conductive resin composition of the present invention is not particularly limited, and the composition may be prepared by e.g. a single screw extruder, a twin screw extruder, a Banbury mixer, a roll mill, a Brabender Plastograph, or a kneader.

It is particularly preferred that the composition is mixed and pelletized by a twin screw kneading extruder and then used for molding.

In a special case, the respective components may be supplied directly to a molding machine, so that the composition is kneaded and molded in the molding machine.

When the conductive resin composition of the present invention is employed, deformation during its use is little, and it is possible to obtain a conductive roller which is excellent in contact with a member to be contacted.

The construction of the conductive roller of the present invention is not particularly limited. However, the core is preferably made of a material having high electroconductivity, and more preferably it is made of a metal. As the type of the metal, aluminum, nickel or stainless steel is, for example, preferred. Among them, stainless steel is particularly preferred, since it scarely rusts and is highly rigid. The layer structure is likewise not particularly limited, and it may be a single layer or a laminate of a plurality of layers having different resistivities. Further, a protective layer may be provided as an outer layer for the purpose of preventing fouling or adjusting the resistivity. When a multi-layer structure is adopted, any one of the layers may be made of the conductive resin composition of the present invention.

There is no particular restriction with respect to the method for preparing the conductive roller of the present invention. The resin composition of the present invention is usually thermoplastic and therefore can be molded by either injection molding or extrusion molding. For example, using an extruder employing a crosshead die, a metal core is inserted from one die, and the molten composition is extruded from another die so that they are integrated and molded. When a multi-layer structure is to be molded, molding can be sequentially carried out from the center layer, or a multi-layer structure may be molded simultaneously by coextrusion employing a plurality of extruders and a crosshead die. Further, the outer most layer may be formed by dip coating using a solution having the resin composition dissolved therein, or it may be formed by using a heat shrinicable tube.

The application of the conductive roller of the present invention is not particularly limited. However, it can be suitably used, for example, as an electronic photographic charged roller, a transfer roller or a conveyor roller.

As a particularly preferred application, an electronic photographic cartridge to be used for a laser beam printer or the like, may be mentioned. The electronic photographic cartridge is meant for an interchangeable unit having the conductive roller of the present invention built in a cartridge as a charged roller together with an electronic photographic photosensitive material, a toner, etc., so as to facilitate the interchange and the mentenance of a laser beam printer.

Now, the present invention will be described in further detail with reference to Examples. However, it should be understood that the present invention is by no means restricted to such specific Examples.

EXAMPLES 1 TO 4 AND COMPARATIVE EXAMPLE 1

The proportions of the components of the elastomer compositions used in the Examples and Comparative Example are shown in Table 1. The details of the respective components in the Table are as follows.

Styrene Type Thermoplastic Elastomer
  Rabalon T331C, manufactured by Mitsubishi Chemical Corporation, JIS-A hardness: 28
Epoxy Compound (a)
  Ethylene-glycidyl methacrylate copolymer-graft-polymethyl methacrelate
  Modiper A4200, manufactured by Nippon Oil and Fats Co., Ltd.
  Epoxy equivalent: 1400 g/equivalent
Epoxy Compound (b)
  Ethylene-glycidyl methacrylate copolymer Bond Fast E, manufactured by Simitomo Chemical Co., Ltd.
  Epoxy equivalent: 1200 g/equivalent
Carbon Black
  Denkablack granule, manufactured by Denki Kagaku K. K.

The materials were Kneaded and granulated by means of a twin screw kneading extruder to obtain pellets.

Then, the pellets were molded by means of an in-line screw type injection molding machine at a molding temperature of from 190 to 240° C. at a die temperature of 50° C. to obtain test specimens (100 mm×100 mm×2 mm).

Then, the volume resistivity, the hardness and the compression set were measured as follows.

Atmosphere for evaluation: The measurements were all conducted in an environment at a temperature of 25° C. under a relative humidity of 50%.

Volume Resistivity

With respect to the above test specimen (1100 mm×100 mm×2 mm), the volume resistivity was measured by a digital super high resistance/micro ammeter "R8340A" manufactured by Kabushiki Kaisha Advantest using as an electrode "R12702A" manufactured by Kabushiki Kaisha Advantest.

Hardness

Six sheets of the above test specimens were intimately overlaid one on another, and then the hardness was measured by a digital hardness meter (in accordance with JIS-A) manufactured by Kabushiki Kaisha Toyo Seki Seisakusho.

Compression Set

Six or seven sheets of the above test specimens were intimately overlaid one on another and polished so that the thickness became 12.7 mm, and a right circular cylinder having a diameter of 29 mm was cut off to obtain a test specimen for measuring the compression set. This test specimen for measuring the compression set and a spacer having a thickness of 9.52 mm were mountained on a measuring apparatus (compression set tester (in accordance with JIS K6301), manufactured by Kobunshi Keiki K.K.), and test specimen was compressed by 25%. In this state, the specimen was heated at 70° C. for 22 hours. Then, the test specimen was left at room temperature (25° C.), and upon expiration of 30 minutes, the thickness was measured.

The compression set was calculated as follows.

$CS=(t_0-t_1)/(t_0-t_2)\times 100$

CS: Compression set (%)

$t_0$: Initial thickness (mm) of the test specimen $t_1$: Thickness (mm) of the test specimen upon expiration of 30 minutes after it was taken out from the compression apparatus $t_2$: Thickness (mm) of the spacer The results of the measurements are shown in Table 1.

TABLE 1

| | Example 1 | Example 2 | Example 3 | Example 4 | Comparative Example 1 |
|---|---|---|---|---|---|
| Styrene type thermoplastic elastomer (parts by weight) | 100 | 100 | 100 | 100 | 100 |
| Epoxy compound (a) (parts by weight) | 2 | 3 | 5 | — | — |
| Epoxy compound (b) (parts by weight) | — | — | — | 5 | — |
| Carbon black (parts by weight) | 20 | 20 | 20 | 20 | 20 |
| Epoxy equivalent (g/equivalent) of resin components (a) + (c) | 68000 | 45000 | 27000 | 24000 | — |
| Epoxy equivalent (g/equivalent) of the entire resin composition | 81000 | 54000 | 32000 | 29000 | — |
| Volume resistivity ($\times 10^5 \Omega$.cm) | 9.3 | 9.3 | 4.3 | 2.1 | 6300 |
| Hardness | 48 | 49 | 50 | 52 | 47 |
| Compression set(%) | 29 | 25 | 29 | 30 | 36 |

According to the present invention, it is possible to obtain a conductive resin composition having a small compression set and having various properties such as hardness, durability and electroconductivity well balanced.

Further, by using the conductive resin composition of the present invention for molding, it is possible to very easily prepare a conductive roller having a performance which is at least equal to the conventional conductive roller employing a vulcanized rubber composition.

What is claimed is:

1. A resin composition comprising a resin (1), a conductive filler (b) and an epoxy compound having an epoxy equivalent of from 1,000 to 100,000 g/equivalent, as a resin modifier (c), wherein the resin (a) contains a styrene type thermoplastic elastomer and/or an olefin type thermoplastic elastomer, said resin composition having a volume resistivity of from $10^2$ to $10^{12}$ Ω·cm and a compression set (Cs1) of at most 35% by JIS K6301.

2. The resin composition according to claim 1, wherein said resin composition has a volume resistivity of from $3 \times 10^4$ to $10^8$ Ω·cm and a compression set (Cs1) of at most 30% by JIS K3601.

3. The resin composition according to claim 1, wherein the epoxy compound is a polymer comprising glycidyl (meth)acrylate as a monomer component constituting the polymer.

4. The resin composition according to claim 1, wherein the conductive filler (b) is carbon black.

5. A resin composition comprising a resin (a) and a conductive filler (b), wherein the resin (a) contains a styrene type thermoplastic elastomer and/or an olefin type thermoplastic elastomer, said resin composition having an epoxy equivalent of from 3,000 to 1,000,000 g/equivalent.

6. The resin composition according to claim 5, wherein the epoxy compound is a polymer comprising glycidyl (meth)acrylate as a monomer component constituting the polymer.

7. The resin composition according to claim 5, wherein the conductive filler (b) is carbon black.

8. A resin composition comprising a resin (a), a conductive filler (b) and a resin modifier (c), wherein the resin (a) contains a styrene type thermoplastic elastomer and/or an olefin type thermoplastic elastomer, and the resin modifier (c) is an epoxy compound having an epoxy equivalent of from 1,000 to 100,000 g/equivalent.

9. The resin composition according to claim 8, wherein the epoxy compound is a polymer comprising glycidyl (meth)acrylate as a monomer component constituting the polymer.

10. The resin composition according to claim 8, wherein the conductive filler (b) is carbon black.

11. A resin composition comprising a resin (a), a conductive filler (b) and an epoxy compound as a resin modifier (c), said resin composition having a volume resistivity of from $10^2$ to $10^{12}$ Ω·cm and satisfying the following formula (I):

$$Cs1 \leq 0.9 \times Cs2 \tag{I}$$

where Cs1 is the compression set of said resin composition by JIS K6301, and Cs2 is the compression set of a composition having the resin modifier removed from said resin composition.

12. The resin composition according to claim 11, wherein the proportions of the respective components (a) to (c) are such that component (b) is from 2 to 200 parts by weight, and the component (c) is from 0.1 to 30 parts by weight, per 100 parts by weight of component (a).

13. The resin composition according to claim 11, wherein the resin modifier (c) is an epoxy compound having an epoxy equivalent of from 1,000 to 100,000 g/equivalent.

14. The resin composition according to claim 11, wherein the epoxy compound is a polymer comprising glycidyl (meth)acrylate as a monomer component constituting the polymer.

15. The resin composition according to claim 11, wherein the conductive filler (b) is carbon black.

16. A conductive roller prepared by molding the resin composition as defined in claim 1.

17. The conductive roller according to claim 16, which is prepared by extrusion molding the resin composition on the surface of a metal core.

18. An electronic photographic cartridge having the conductive roller as defined in claim 16 built in as a charged roller.

* * * * *